(12) United States Patent
Liu et al.

(10) Patent No.: US 9,535,305 B1
(45) Date of Patent: Jan. 3, 2017

(54) ELECTROCHROMIC DEVICE AND PROCESS FOR MAKING THE SAME

(71) Applicant: Tintable Kibing Co., Ltd., Tainan (TW)

(72) Inventors: Cheng-Hao Liu, Tainan (TW); Yi-Wen Chung, Tainan (TW)

(73) Assignee: TINTABLE KIBING CO., LTD., Tainan (TW)

( * ) Notice: Subject to any disclaimer, the term of this patent is extended or adjusted under 35 U.S.C. 154(b) by 0 days.

(21) Appl. No.: 14/995,005

(22) Filed: Jan. 13, 2016

(30) Foreign Application Priority Data

Jul. 13, 2015 (TW) .............................. 104122572 A (51) Int. Cl.
*G02F 1/153* (2006.01)
*B29C 65/48* (2006.01)
*B29C 65/14* (2006.01)
*B29C 65/16* (2006.01)
*G02F 1/15* (2006.01)

(52) U.S. Cl.
CPC ............. *G02F 1/1533* (2013.01); *B29C 65/14* (2013.01); *B29C 65/16* (2013.01); *B29C 65/48* (2013.01); *G02F 2001/1519* (2013.01)

(58) Field of Classification Search
CPC .......... G02F 1/1533; G02F 1/15; G02F 1/153; G02F 2001/1519; B29C 65/16; B29C 65/14; B29C 65/48

USPC .......................... 359/265–275, 900; 345/105
See application file for complete search history.

(56) References Cited

U.S. PATENT DOCUMENTS 8,780,432 B1 * 7/2014 Nguyen ................ G02F 1/1347
359/265
2005/0285522 A1 12/2005 Han et al.
2008/0095973 A1 4/2008 Abrams

FOREIGN PATENT DOCUMENTS

CN 101233553 A 7/2008

* cited by examiner

*Primary Examiner* — Tuyen Tra
(74) *Attorney, Agent, or Firm* — DLA Piper LLP (US)

(57) ABSTRACT

An electrochromic device includes upper and lower substrate units, and an electrochromic laminate sandwiched between an upper electrode of the upper substrate unit and a lower electrode of the lower substrate unit. The electrochromic laminate includes en ion storage layer formed on the upper electrode, an active layer formed on the lower electrode, and a polymer electrolyte sandwiched between inner surfaces of the ion storage layer and the active layer. At least one of the inner surfaces has a roughened peripheral region such that an adhesion force generated between the roughened peripheral region and the polymer electrolyte is effective to minimize thermal shrinkage of the polymer electrolyte.

14 Claims, 7 Drawing Sheets

ELECTROCHROMIC DEVICE AND PROCESS FOR MAKING THE SAME

CROSS-REFERENCE TO RELATED APPLICATION

This application claims priority from Taiwanese application no. 104122572, filed. on Jul. 13, 2015.

FIELD

The disclosure relates to an electrochromic device, more particularly to an electrochromic device and a process for making the same.

BACKGROUND

Figure 1:
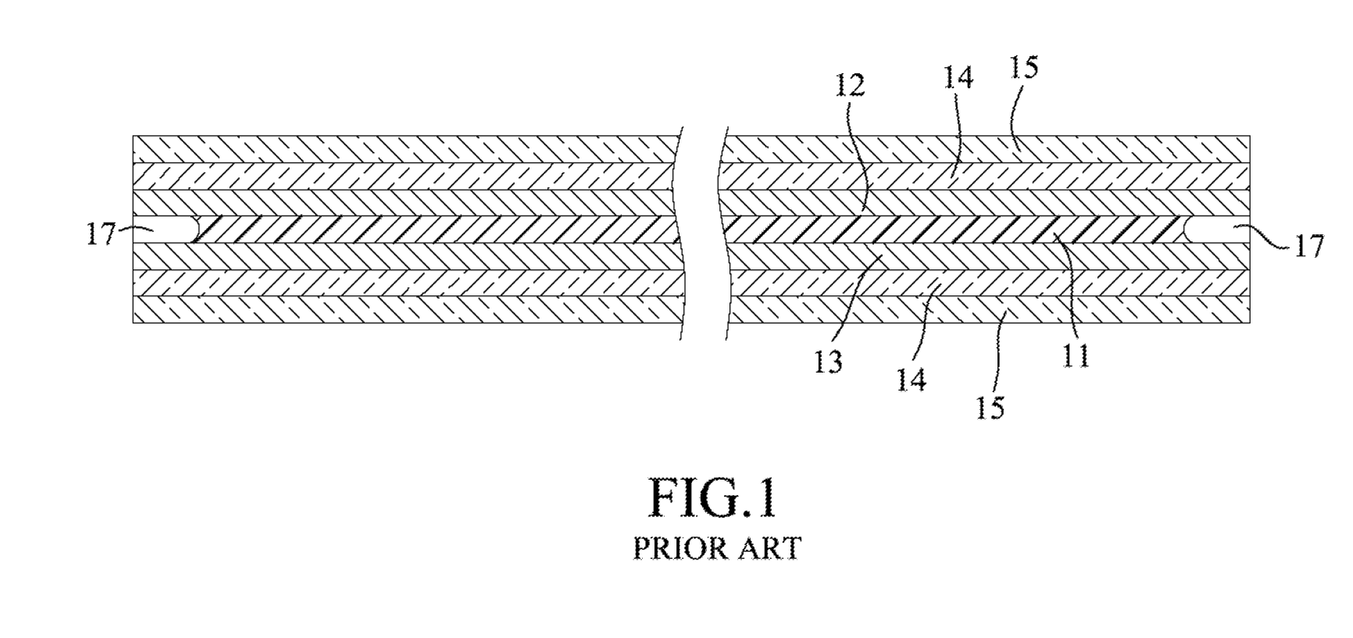
FIG. 1 is a schematic cross-sectional view of a conventional electrochromic device.
Figure 2:
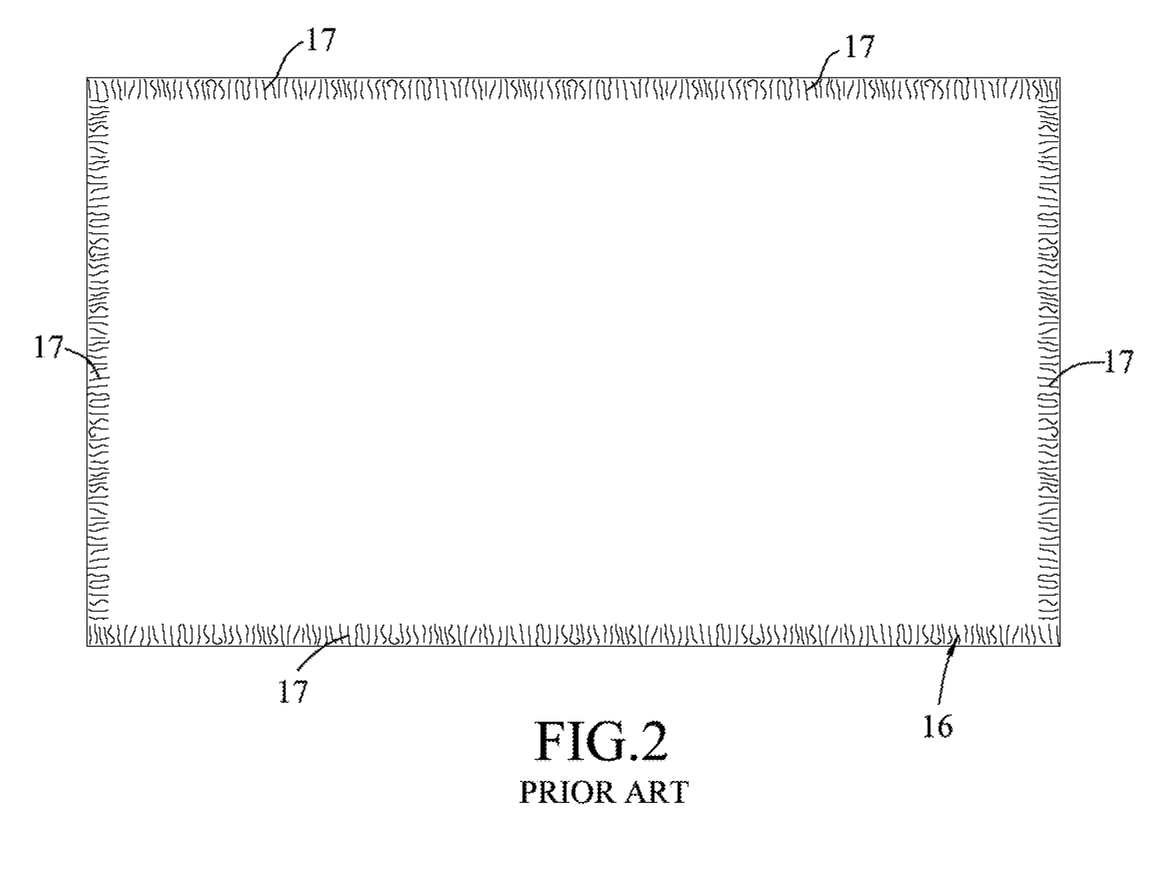
FIG. 2 is a schematic top view of the conventional electrochromic device.

An electrochromic device is capable of varying its light transmission in response to a voltage applied between two electrodes on the device, and can be used for applications such as mirrors or windows of vehicles, buildings, etc. As shown in FIGS. 1 and 2, a conventional electrochromic device includes two glass substrates 15, two transparent electrodes 14 formed respectively on the glass substrates 15, and an electrochromic laminate sandwiched between the two transparent electrodes 14. The electrochromic laminate includes an active layer 12, an ion storage layer 13, and a polymer electrolyte 11 sandwiched between the active layer 12 and the ion storage layer 13. The polymer electrolyte 11 includes an adhesive material and thus can bond the active layer 12 and the ion storage layer 13 together. The active layer 12 is made of an electrochromic material, such as tungsten trioxide ($WO_3$). The ion storage layer 13 is made of a material which can undergo reversible oxidation and reduction reactions, such as nickel oxide. The transparent electrodes 14 are made of, for example, indium tin oxide.

Due to generation of internal stress of the polymer electrolyte 11 resulting possibly from irradiation of ambient light or changes in temperature of the electrochromic device in use, the polymer electrolyte 11 may suffer from thermal shrinkage after a period of use. The conventional electrochromic device thus may have a plurality of undesirable shrinkage lines 17 at its periphery 16 as shown in FIGS. 1 and 2. Although the polymer electrolyte 11 may have an increased thickness to address such problem, the electrochromic device with a thick polymer electrolyte 11 would have a slow response speed in response to a voltage applied between the transparent electrodes 14.

SUMMARY

Therefore, an object of the disclosure is to provide a novel electrochromic device in which a polymer electrolyte is less likely to be subjected to the thermal shrinkage, and a process for making the electrochromic device.

According to a first aspect of the disclosure, an electrochromic device includes upper and lower substrate units and an electrochromic laminate. At least one of the upper and lower substrate units is light-transmissive. The upper substrate unit has an upper substrate body and an upper electrode formed on the upper substrate body. The lower substrate unit has a lower substrate body and a lower electrode formed on the lower substrate body. The electrochromic laminate is sandwiched between the upper and lower electrodes, and includes an ion storage layer, an active layer, and a polymer electrolyte. The ion storage layer is formed on the upper electrode, and has a first inner surface which is opposite to the upper electrode, and which includes a first central region and a first peripheral region. The active layer is made of an electrochromic material, is formed on the lower electrode, and has a second inner surface that is opposite to the lower electrode, and that includes a second central region and a second peripheral region. The polymer electrolyte is sandwiched between the first inner surface of the ion storage layer and the second inner surface of the active layer, and is made from a polymeric adhesive material such that the active layer and the ion storage layer are bonded to each other by means of the polymer electrolyte. At least one of the first and second peripheral regions is roughened to increase a contact area between the polymer electrolyte and the at least one of the first and second peripheral regions such that an adhesion force generated therebetween is effective to minimize thermal shrinkage of the polymer electrolyte caused by internal stress of the polymer electrolyte.

According to a second aspect of the disclosure, a process for making an electrochromic device includes steps of:

(a) preparing upper and lower substrate units, at least one of which is light-transmissive, the upper substrate unit having an upper substrate body and an upper electrode formed on the upper substrate body, the lower substrate unit having a lower substrate body and a lower electrode formed on the lower substrate body;

(b) forming on the upper electrode an ion storage layer which has a first inner surface that is opposite to the upper electrode, and that includes a first central region and a first peripheral region;

(c) forming on the lower electrode an active layer which is made of an electrochromic material, and which has a second inner surface that is opposite to the lower electrode, and that includes a second central region and a second peripheral region; and (d) disposing between the first and second inner surfaces a polymer electrolyte made from a polymeric adhesive material such that the active layer and the ion storage layer are bonded to each other by means of the polymer electrolyte, wherein the process further comprises, before step (d), is step (c1) of roughening at least one of the first and second peripheral regions to increase a contact area between the polymer electrolyte and the at least one of the first and second peripheral regions such that an adhesion force generated therebetween is effective to minimize thermal shrinkage of the polymer electrolyte caused by internal stress of the polymer electrolyte.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 3:
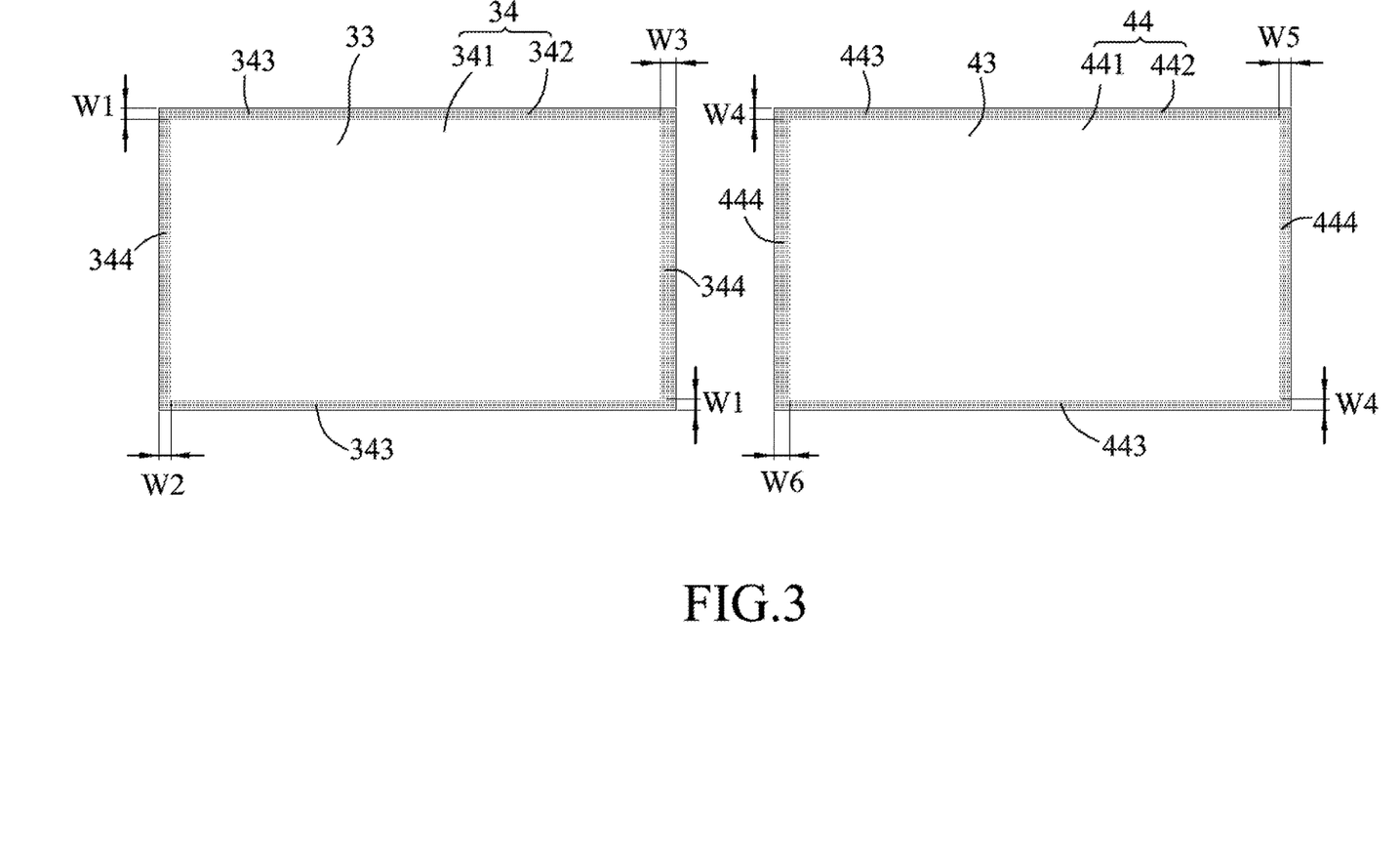
FIG. 3 is a schematic view illustrating inner surfaces of an ion storage layer and an active layer of an electrochromic device according to an embodiment of the disclosure.
Figure 4:
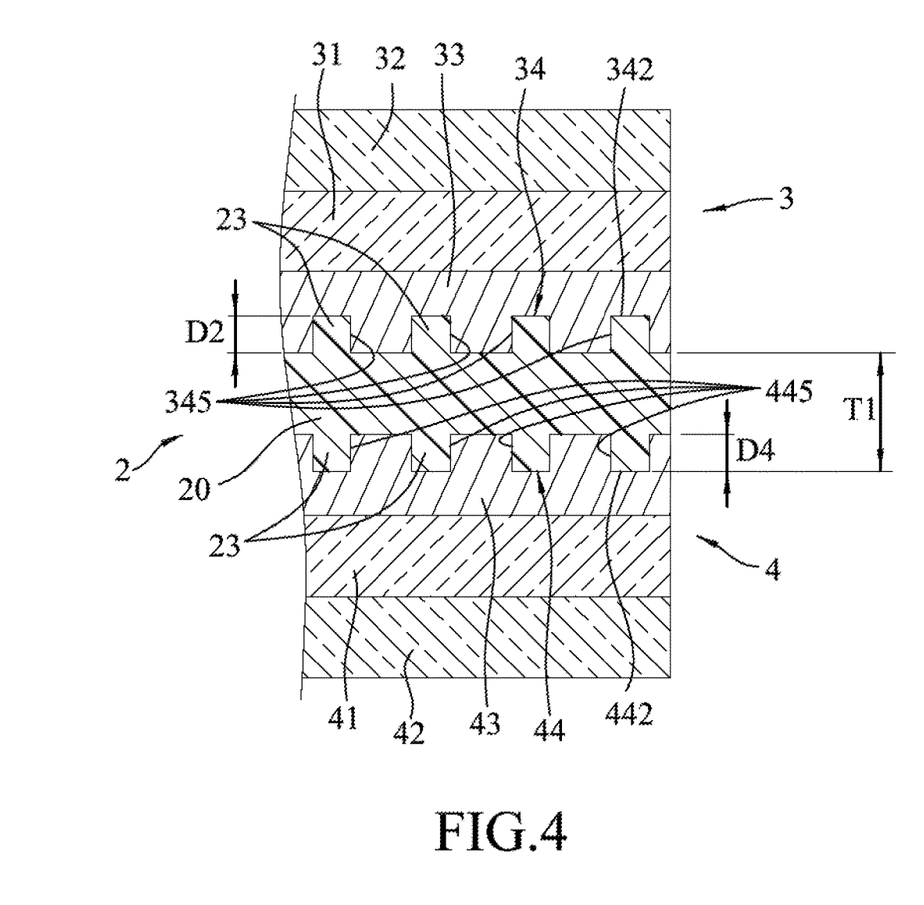
FIG. 4 is a schematic fragmentary cross-sectional view of the electrochromic device according to the disclosure.

With reference to FIGS. 3 and 4, an electrochromic device according to an embodiment of the disclosure includes an electrochromic laminate 2 and upper and lower substrate units 3, 4. At least one of the upper and lower substrate units 3, 4 is light-transmissive. In this embodiment, both of the upper and lower substrate units 3, 4 are light-transmissive. It should be noted that the drawings, which are for illustrative purposes only, are not drawn to scale, and are not intended to represent the actual sizes or actual relative sizes of the components of the electrochromic device.

The upper substrate unit 3 has an upper substrate body 32 and an upper electrode 31 formed on the upper substrate body 32. In this embodiment, the upper substrate body 32 is made of glass, and the upper electrode 31 is made of indium tin oxide and may have a thickness ranging from 50 nm to 200 nm.

The lower substrate unit 4 has a lower substrate body 42 and a lower electrode 41 formed on the lower substrate body 42. In this embodiment, the lower substrate body 42 is made of glass, and the lower electrode 41 is made of indium tin oxide and may have a thickness ranging from 50 nm to 200 nm.

The electrochromic laminate 2 is sandwiched between the upper and lower electrodes 31, 41, and includes an ion storage layer 33, an active layer 43, and a polymer electrolyte 20.

The ion storage layer 33 is formed on the upper electrode 31, and has a first inner surface 34 opposite to the upper electrode 31. The first inner surface 34 includes a first central region 341 and a first peripheral region 342 surrounding the first central region 341.

The active layer 43 is made of an electrochromic material, is formed on the lower electrode 41, and has a second inner surface 44 opposite to the lower electrode 41. The second inner surface 44 includes a second central region 441 and a second peripheral region 442 surrounding the second central region 441.

In this embodiment, the active layer 43 is a layer of cathodic electrochromic material, such as tungsten trioxide, and may have a thickness ranging from 300 nm to 2300 nm. The ion storage layer 33 is a layer of anodic electrochromic material, such as nickel oxide, and may have a thickness ranging from 300 nm to 2300 nm.

The polymer electrolyte 20 is sandwiched between the first inner surface 34 of the ion storage layer 33 and the second inner surface 44 of the active layer 43, and is made from a polymeric adhesive material such that the active layer 43 and the ion storage layer 33 are bonded to each other by means of the polymer electrolyte 20. The polymeric adhesive material may include any suitable components, as long as the polymer electrolyte 20 made from the polymeric adhesive material can function as a binder and an electrolyte. For example, the polymeric adhesive material may include UV-curable monomers, a plasticizer, a photoinitiator, and an electrolyte salt.

At least one of the first and second peripheral regions 342, 442 is roughened to increase a contact area between the polymer electrolyte 20 and the at least one of the first and second peripheral regions 342, 442 such that an adhesion force generated therebetween is effective to minimize thermal shrinkage of the polymer electrolyte 20 caused by internal stress of the polymer electrolyte 20. The internal stress of the polymer electrolyte 20 may result from irradiation of ambient light or changes in temperature of the electrochromic device in use.

Figure 5:
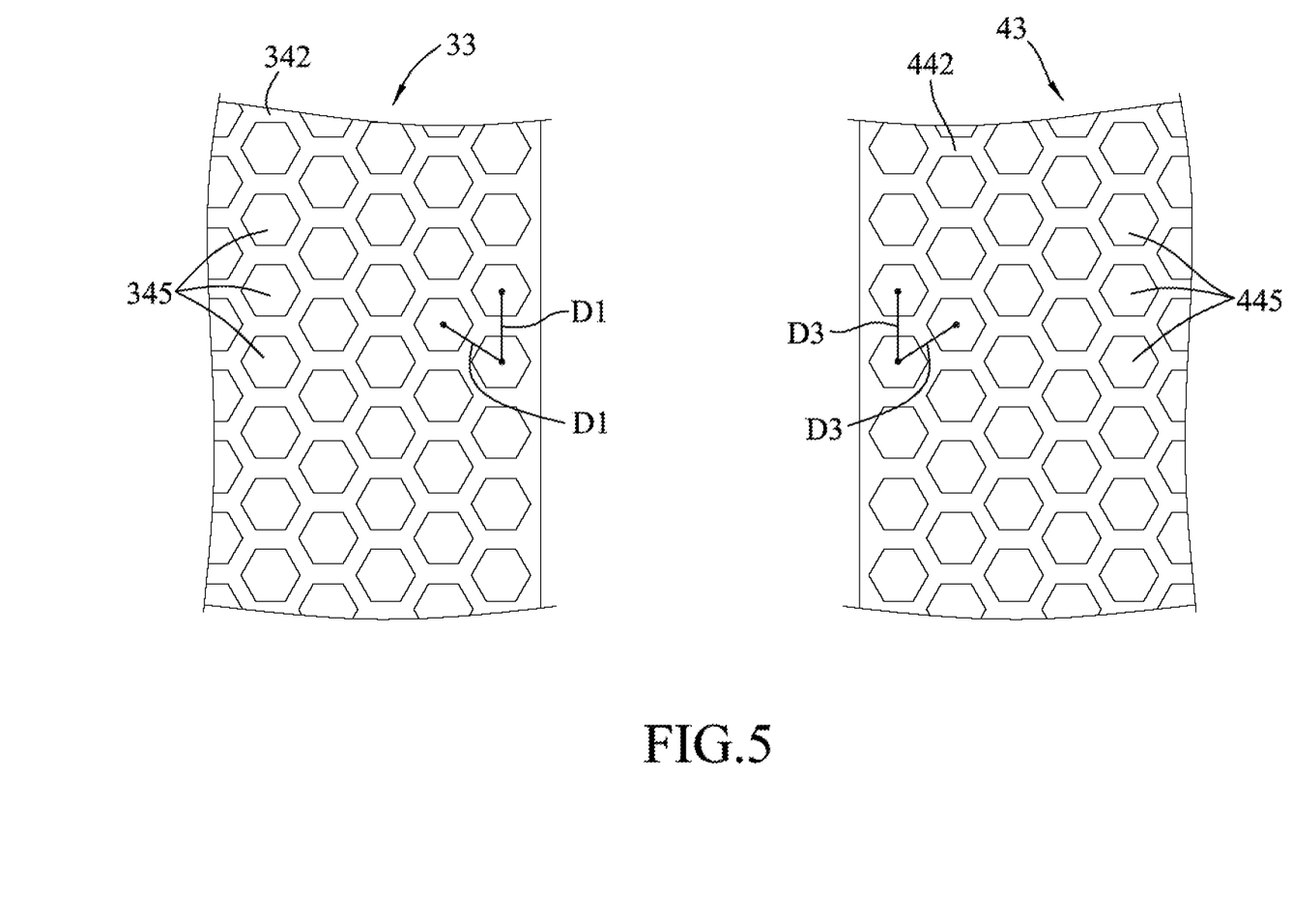
FIG. 5 is a schematic enlarged view illustrating peripheral regions of the inner surfaces of the ion storage layer and the active layer.

With reference to FIGS. 4 and 5, each of the first and second peripheral regions 342, 442 is roughened to form a plurality of blind holes 345, 445 therein. The blind holes 345, 445 are formed using a laser beam.

The blind holes 345, 445 have a depth (D2, D4) ranging from 200 nm to 2000 nm, preferably from 200 nm to 800 nm. If the depth (D2, D4) of the blind holes 345, 445 is not deep enough, the adhesion force generated among the polymer electrolyte 20 and the first and second peripheral regions 342, 442 is not effective to minimize thermal shrinkage of the polymer electrolyte 20. If the blind holes 345, 445 are too deep and penetrate the ion storage layer 33 and the active layer 43, respectively, breakage of the ion storage layer 33 and/or the active layer 43 may result, which ma adversely affect the function of the upper and lower electrodes 31, 41, thereby slowing down the response of the ion storage layer 33 and the active layer 43 to a voltage applied between the upper and lower electrodes 31, 41.

A center-to-center distance (D1) between two adjacent ones of the blind holes 345 in the roughened first peripheral region 342 ranges from 0.05 mm to 0.5 mm, preferably from 0.1 mm to 0.2 mm. A center-to-center distance (D3) between two adjacent ones of the blind holes 445 in the roughened second peripheral region 442 ranges from 0.05 mm to 0.5 mm, preferably from 0.1 mm to 0.2 mm. If the center-to-center distances (D1, D3) are too large, the adhesion force generated among the polymer electrolyte 20 and the first and second peripheral regions 342, 442 is not effective to minimize thermal shrinkage of the polymer electrolyte 20. If the center-to-center distances (D1, D3) are too small, the mechanical properties of the first peripheral region 342 of the ion storage layer 33 and the second peripheral region 442 of the active layer 43 may be adversely affected.

With reference to FIG. 3, each of the roughened first and second peripheral regions 342, 442 has a width (W1, W2, W3, W4, W5, and W6) ranging from 0.5 mm to 5 mm, preferably from 2.5 mm to 3.5 mm. If the width (W1, W2, W3, W4, W5, and W6) is too small, the adhesion force generated among the polymer electrolyte 20 and the first and second peripheral regions 342, 442 is not effective to minimize thermal shrinkage of the polymer electrolyte 20. If the width (W1, W2, W3, W4, W5, and W6) is too large, the effective area of the electrochromic device, i.e., the areas of the first and second central regions 341, 441, is diminished.

Figure 6:
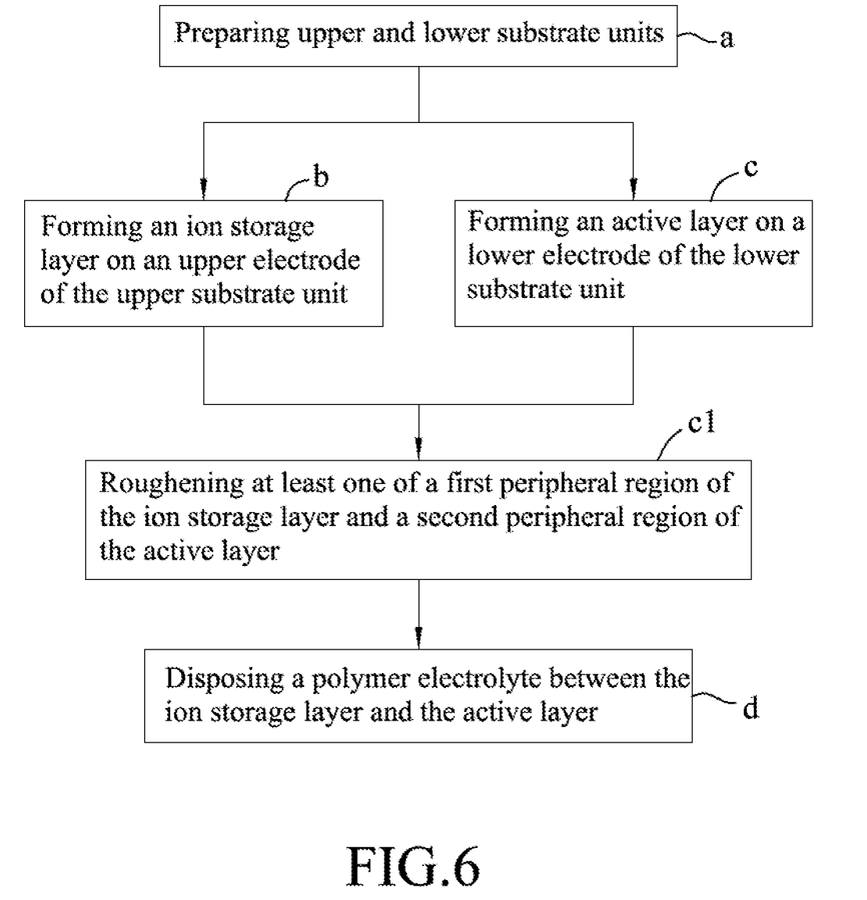
FIG. 6 is a block diagram illustrating a process for making the electrochromic device according to the disclosure.
Figure 7:
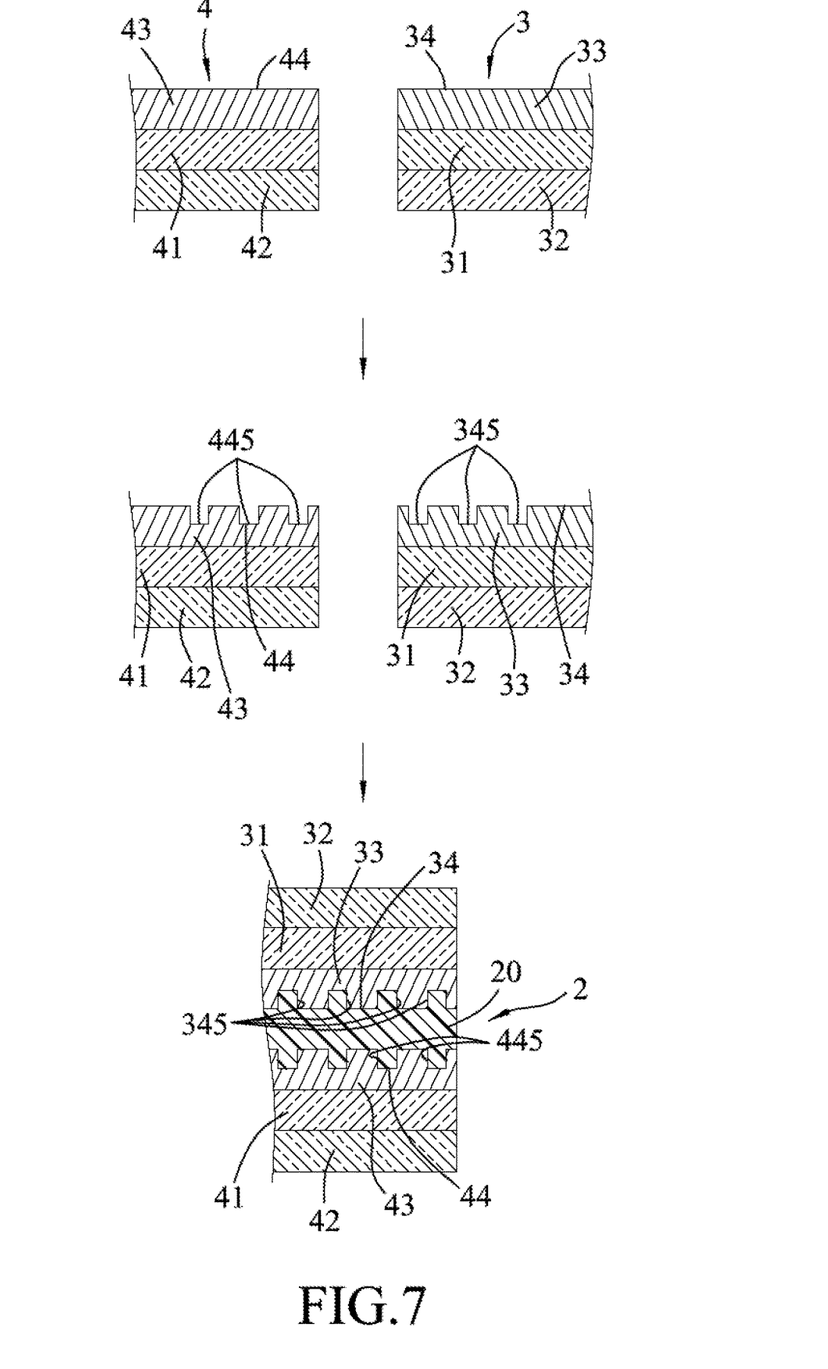
FIG. 7 is a flow diagram illustrating the process for making the electrochromic device according to the disclosure.

A process for making the electrochromic device according to the embodiment of the disclosure will be described with reference to FIGS. 4, 6, and 7. The process includes steps (a) to (d).

In step (a), the upper and lower substrate units 3, 4 are prepared.

In step (b), the ion storage layer 33 is formed on the upper electrode 31 of the upper substrate unit 3. The ion storage layer 33 has the first inner surface 34 including the first central region 341 and the first peripheral region 342.

In step (c), the active layer 43 is formed on the lower electrode 41 of the lower substrate unit 4. The active layer 43 has the second inner surface 44 including the second central region 441 and the second peripheral region 442.

In step (d), the polymer electrolyte 20 is disposed between the first inner surface 34 of the ion storage layer 33 and the second inner surface 44 of the active layer 43, and is made from the polymeric adhesive material such that the active layer 43 and the ion storage layer 33 are bonded to each other by means of the polymer electrolyte 20.

Before step (d), the process further includes a step (c1) of roughening at least one of the first and second peripheral regions 342, 442 to increase a contact area between the polymer electrolyte 20 and the at least one of the first and second peripheral regions 342, 442 such that an adhesion force generated therebetween is effective to minimize thermal shrinkage of the polymer electrolyte 20 caused by internal stress of the polymer electrolyte 20.

In this embodiment, each of the first and second peripheral regions 342, 442 is roughened to form the blind holes 345, 445 therein. All or some of the blind holes 345, 445 may be selectively filled with the material of the polymer electrolyte 20. Each of the blind holes 345, 445 is formed by irradiating a corresponding one of the first and second peripheral regions 342, 442 with a laser beam having a power ranging from 4 w to 20 w for a laser pulse duration ranging from 0.1 ms to 0.5 ms.

The embodiment of the disclosure will now be explained in more detail below by way of the following Example 1 and Comparative Example 1.

EXAMPLE 1

An electrochromic device was made according to the above described process. Each of the upper and lower substrates units 3, 4, the ion storage layer 33, the active layer 43, and the polymer electrolyte 20 had a rectangular shape and a dimension of 134.8 mm×78.7 mm. Each of the upper and lower substrate bodies 32, 42 was made of glass. Each of the upper and lower electrodes 31, 41 was made of indium tin oxide and had a thickness of 70 nm.

The ion storage layer 33 was made of nickel oxide and had a thickness of 650 nm. The active layer 43 was made of tungsten trioxide and had a thickness of 800 nm. As shown in FIG. 3, the first peripheral region 342 on the ion storage layer 33 had two long-side areas 343 and two short-side areas 344. Each of the long-side areas 343 had a width (W1) of 2.5 mm. One of the short-side areas 344 had a width (W2) of 2.5 mm, and the other of the short-side areas 344 had a width (W3) of 3.5 mm. The second peripheral region 442 on the active layer 43 had two long-side areas 443 and two short-side areas 444. The long-side areas 443 had a width (W4) of 2.5 mm. One of the short-side areas 444 had a width (W5) of 2.5 mm, and the other of the short-side areas 444 had a width (W6) of 3.5 mm.

The blind holes 345 formed in first peripheral region 342 of the ion storage layer 33 had a depth (D2) of 600 nm, and the center-to-center distance (D1) between two adjacent ones of the blind holes 345 was 0.1 mm. The blind holes 445 formed in one second peripheral region 442 of the active layer 43 had a depth (D4) of 600 nm, and the center-to-center distance (D3) between two adjacent ones of the blind holes 445 was 0.1 mm. Each of the blind holes 345, 445 was formed in the ion storage layer 33 by irradiating a corresponding one of the first and second peripheral regions 342, 442 with a laser beam having a power of 10 w for a laser pulse duration of 0.5 ms.

The polymer electrolyte 20 (T1) was made from a material including UV/Visible adhesive (Loctite® 3321™, Henkel Taiwan Ltd.) and electrolyte salts, and had a thickness of 100 μm.

COMPARATIVE EXAMPLE 1

An electrochromic device was prepared by a process similar to the process for making the electrochromic device of Example 1, except that the blind holes 345, 445 were not formed.

Reliabilities of the electrochromic devices of Example 1 and Comparative Example 1 were determined by a thermal shock test for 10 cycles. For each cycle, each of the electrochromic devices was heated to and maintained at 85° C. for 1 hour, cooled to and maintained at 25° C. for 0.5 hour, further cooled to and maintained at −30° C. for 1 hour, and then heated to and maintained at 25° C. for 0.5 hour. After the thermal shock test, it could be observed that the polymer electrolyte in the electrochromic device of Example 1 shrank inwardly for 0.1 mm, and that the polymer electrolyte in the electrochromic device of Comparative Example 1 shrank inwardly for 10 mm. It is evident that the provision of the blind holes 345, 445 in the electrochromic device is effective to minimize thermal shrinkage of the polymer electrolyte.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electrochromic device comprising:
    upper and lower substrate units, at least one of which is light-transmissive, said upper substrate unit having an upper substrate body and an upper electrode formed on said upper substrate body, said lower substrate unit having a lower substrate body and a lower electrode formed on said lower substrate body; and
    an electrochromic laminate sandwiched between said upper and lower electrodes, and including
        an ion storage layer formed on said upper electrode, and having a first inner surface which is opposite to said upper electrode, and which includes a first central region and a first peripheral region,
        an active layer which is made of an electrochromic material, which is formed on said lower electrode, and which has a second inner surface that is opposite to said lower electrode, and that includes a second central region and a second peripheral region,
        a polymer electrolyte which is sandwiched between said first inner surface of said ion storage layer and said second inner surface of said active layer, and which is made from a polymeric adhesive material such that said active layer and said ion storage layer are bonded to each other by means of said polymer electrolyte, wherein
        at least one of said first and second peripheral regions is roughened to increase a contact area between said polymer electrolyte and said at least one of said first and second peripheral regions such that an adhesion force generated therebetween is effective to minimize thermal shrinkage of said polymer electrolyte caused by internal stress of said polymer electrolyte.

2. The electrochromic device according to claim 1, wherein each of said first and second peripheral region is roughened.

3. The electrochromic device according to claim 2, wherein each of said first and second peripheral regions is roughened to form a plurality of blind holes therein.

4. The electrochromic device according to claim 3, wherein said blind holes are formed using a laser beam.

5. The electrochromic device according to claim 4, wherein each of said blind holes has a depth ranging from 200 nm to 2000 nm.

6. The electrochromic device according to claim 3, wherein, in each of said first and second peripheral regions, a center-to-center distance between two adjacent ones of said blind holes ranges from 0.05 mm to 0.5 mm.

7. The electrochromic device according to claim 3, wherein each of said first and second peripheral regions has a width ranging from 0.5 mm to 5 mm.

8. A process for making an electrochromic device, comprising steps of:
preparing upper and lower substrate units, at least one of which is light-transmissive, the upper substrate unit having an upper substrate body and an upper electrode formed on the upper substrate body, the lower substrate unit having a lower substrate body and a lower electrode formed on the lower substrate body;
(b) forming on the upper electrode an ion storage layer which has a first inner surface that is opposite to the upper electrode, and that includes a first central region and a first peripheral region;
(c) forming on the lower electrode an active layer which is made of an electrochromic material, and which has a second inner surface that is opposite to the lower electrode, and that includes a second central region and a second peripheral region; and
(d) disposing between the first and second inner surfaces a polymer electrolyte made from a polymeric adhesive material such that the active layer and the ion storage layer are bonded to each other by means of the polymer electrolyte, wherein
the process further comprises, before step (d), a step (c1) of roughening at least one of the first and second peripheral regions to increase a contact area between the polymer electrolyte and the at least one of the first and second peripheral regions such that an adhesion force generated therebetween is effective to minimize thermal shrinkage of the polymer electrolyte caused by internal stress of the polymer electrolyte.

9. The process according to claim 8, wherein, in step (c1), each of the first and second peripheral regions is roughened.

10. The process according to claim 9, wherein each of the first and second peripheral regions is roughened to form a plurality of blind holes therein.

11. The process according to claim 10, wherein each of the blind holes is formed by irradiating a corresponding one of the first and second peripheral regions with a laser beam having a power ranging from 4 w to 20 w for a laser pulse duration ranging from 0.1 ms to 0.5 ms.

12. The process according to claim 11, wherein each of the blind holes has a depth ranging from 200 nm to 2000 nm.

13. The process according to claim 12, wherein, in each of the first and second peripheral regions, a center-to-center distance between two adjacent ones of the blind holes ranges from 0.05 mm to 0.5 mm.

14. The process according to claim 10, wherein each of the first and second peripheral regions has a width ranging from 0.5 mm to 5 mm.

* * * * *